United States Patent [19]

Szu

[11] Patent Number: 4,538,275

[45] Date of Patent: Aug. 27, 1985

[54] SYNERGISTIC QUASI-FREE ELECTRON LASER

[76] Inventor: Harold H. Szu, 9402 Wildoak Dr., Bethesda, Md. 20814

[21] Appl. No.: 584,224

[22] Filed: Feb. 27, 1984

[51] Int. Cl.³ .............................................. H01S 3/30
[52] U.S. Cl. ......................................... 372/4; 372/2; 372/70; 315/4; 315/5
[58] Field of Search ..................... 372/2, 74, 5, 76, 69, 372/70; 315/3, 4, 5; 330/4.3

[56] References Cited

U.S. PATENT DOCUMENTS

| | | |
|---|---|---|
| 3,467,914 | 4/1964 | Muller . |
| 3,622,833 | 11/1971 | Takeda et al. ........................ 315/4 |
| 3,639,774 | 2/1972 | Wolff . |
| 3,730,979 | 5/1973 | Schwarz et al. ..................... 315/4 |
| 3,822,410 | 7/1974 | Madey . |
| 3,886,483 | 5/1975 | Miley . |
| 3,900,803 | 8/1975 | Silfvast et al. . |
| 3,958,189 | 5/1976 | Sprangle et al. . |
| 4,189,686 | 2/1980 | Brau et al. . |
| 4,203,078 | 5/1980 | Daugherty et al. . |
| 4,218,628 | 8/1980 | Harris . |
| 4,224,576 | 9/1980 | Granatstein et al. . |

OTHER PUBLICATIONS

Harold H. Szu "Laser Light Backscattering off an Electron Beam-Plasma System"; IEEE Journal of Quantum Electronics, vol. QE-19, No. 3, Mar. 1983; pp. 379-388.
Jones, "Synergistic Effects of Simultaneous Beam and RF Plasma Heating"; Physics Letters, vol. 58A, No. 5, p. 307, Sep. 20, 1976.

*Primary Examiner*—William L. Sikes
*Assistant Examiner*—Scott S. Léon
*Attorney, Agent, or Firm*—Robert F. Beers; William T. Ellis; John L. Forrest

[57] ABSTRACT

A synergistic quasi-free electron laser for generating infrared radiation. The laser includes a means for producing a volume of ionized gas plasma, a means for directing an electron beam through the gas plasma in a first direction, and a means for directing a laser pump beam into the gas plasma in a second direction opposite to the first direction to produce synergistic bunching of the electron beam and the ionized gas plasma. A portion of the laser pump beam is backscattered by the bunched electron beam and gas plasma to form an output beam having a frequency up-shifted from that of the laser pump beam. The frequency of the output beam may be tuned by changing the velocity of the electron beam.

17 Claims, 2 Drawing Figures

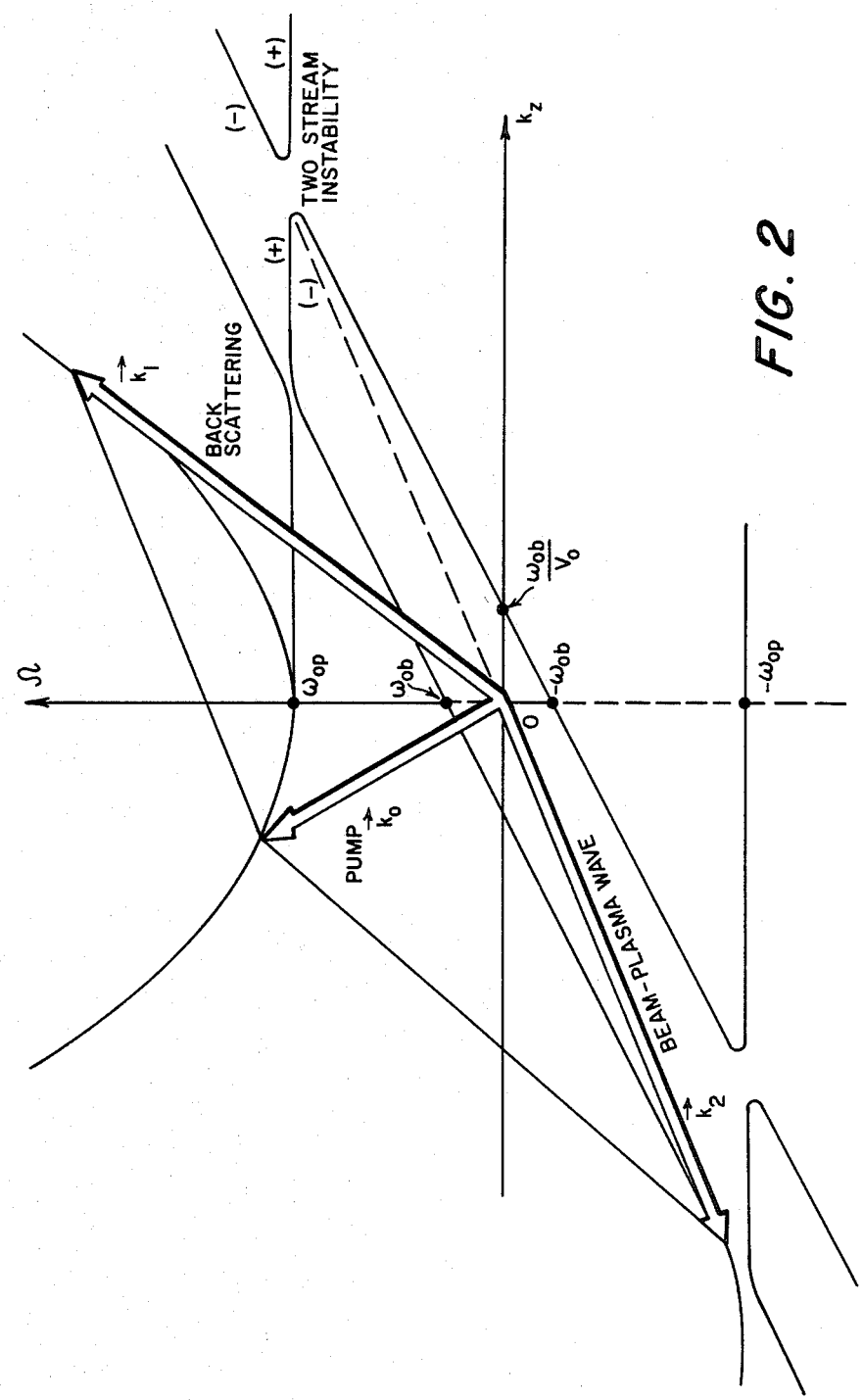

SYNERGISTIC QUASI-FREE ELECTRON LASER

BACKGROUND OF THE INVENTION

The present Invention relates in general to a novel method and apparatus for generating micron wavelength radiation (infrared radiation) and, more particularly, to a novel rapidly tunable quasi-free electron laser for use at micron wavelengths.

Various techniques have been proposed for generating radiation in the millimeter and submillimeter wavelength regions including miniaturized microwave tube sources, quantum mechanical sources, and stimulated scattering from relativistic electron beams. For example, in U.S. Pat. No. 3,639,774 far infrared radiation is generated by backscattering microwaves from a relativistic electron beam having a direction along a parallel magnetic field of a magnitude chosen to make the electron cyclotron frequency approximately equal to the microwave frequency. Coherent radiation at far infrared wavelengths is then produced by resonating the backscattered radiation to produce stimulated emission of the far infrared radiation. While successful in generating far infrared radiation, this technique has limited application due to its inherent low power and limited tunability.

U.S Pat. No. 3,822,410 discloses a tunable high power radiation source for use in the range from infrared to X-ray wavelengths. In this technique, a relativistic electron beam is subjected to a periodic transverse magnetic field. The resultant periodic deflection of the electron beam causes stimulated emission of radiation from the electron beam. Tuning is accomplished by varying the electron beam energy or by varying the magnetic field strength. A drawback of this technique is the large size and weight of the hardware required for implementation.

U.S. Pat. No. 3,958,189 describes a tunable high power submillimeter radiation source which generates radiation by backscattering from an intense relativistic electron beam. Here the relativistic electron beam and microwave energy counter-propagate in a parallel magnetic field. The frequency of the microwave energy is tuned to be mismatched by a specific amount from the electron cyclotron frequency in the rest frame of the electrons at high beam current. As a result, electron bunching occurs which acts to scatter the microwave energy to generate submillimeter radiation. Tuning is accomplished by tuning the microwave frequency or by changing the energy of the electron beam. The necessity of generating a cold relativistic electron beam is the major handicap of this technique.

The techniques exemplified by the above-described U.S. patents are all of a general type known as free electron lasers which are based on relativistic electron beams. In free electron lasers, a portion of the kinetic energy present in a relativistic beam of free, or unbound electrons, is converted into the desired wave energy via the interaction between the electron beam and a rippled magnetic field and, possibly, other forms of radiation. This is to be distinguished from conventional lasers wherein radiation is produced by the stimulated emission from an inverted population of bound electrons in a lasing atomic/molecular medium.

One of the major disadvantages of known free electron lasers is the requirement that the electron beam be of a relativistic energy level. Additionally, these devices require large magnetic fields frequenctly having complicated field profiles. These requirements increase the size, complexity, and cost of such devices and greatly complicate the tuning of these devices.

Much current research effort is being expended in the area of free electron lasers in order to improve their efficiency, size, economics, and recycling. Of particular interest is the development of free electron lasers for use in the 8 to 10 μm wavelength "atmosphere window" range wherein reduced atmospheric absorption is exhibited. This spectral range is highly desirable for aircraft countermeasures applications.

The present Invention is directed to a novel rapidly tunable radiation generator for use in the 8 to 10 μm wavelength range which does not require a relativistic electron beam for generation. The generator combines the principles of the free electron laser with bound electron lasers and thus is termed a synergistic quasi-free electron laser.

SUMMARY OF THE INVENTION

Accordingly, one object of the present Invention is to provide a novel radiation generator device for use in the 8 to 10 μm wavelength range.

Another objective is to provide a novel radiation generator device which is rapidly tunable in wavelength.

Yet another objective is to provide a novel radiation generator device which is compact and energy efficient.

Still another objective is to provide a novel radiation generator device which utilizes a non relativistic electron beam for operation.

These and other objects and advantages are provided by a novel infrared generator device according to the present Invention which includes a means for producing a volume of ionized gas plasma, a means for directing an electron beam through the gas plasma in a first direction, and a means for directing a laser pump beam into the gas plasma in a second direction opposite to the first direction to produce synergistic bunching of the electron beam and the ionized gas plasma. A portion of the laser pump beam is backscattered by the synergistically bunched electron beam and gas plasma to form an output beam. The backscattered output beam has a frequency $\Omega_1$ as given by:

$$\Omega_1 = \Omega_o \left[ \left(1 + \frac{V_{ob}}{c}\right) \bigg/ \left(1 - \frac{V_{ob}}{c}\right) \right]$$

where:
$\Omega_o$ is the frequency of the laser pump beam;
$V_{ob}$ is the velocity of the electron beam; and
c is the free-space velocity of light.

BRIEF DESCRIPTION OF THE DRAWINGS

A more complete appreciation of the Invention and many of the attendant advantages thereof will be readily obtained as the same becomes better understood by reference to the following detailed description when considered in connection with the accompanying drawings, wherein:

FIG. 2 is a dispersion diagram for the synergic quasi-free electron laser shown in FIG. 1.

DESCRIPTION OF THE PREFERRED EMBODIMENTS

Figure 1:
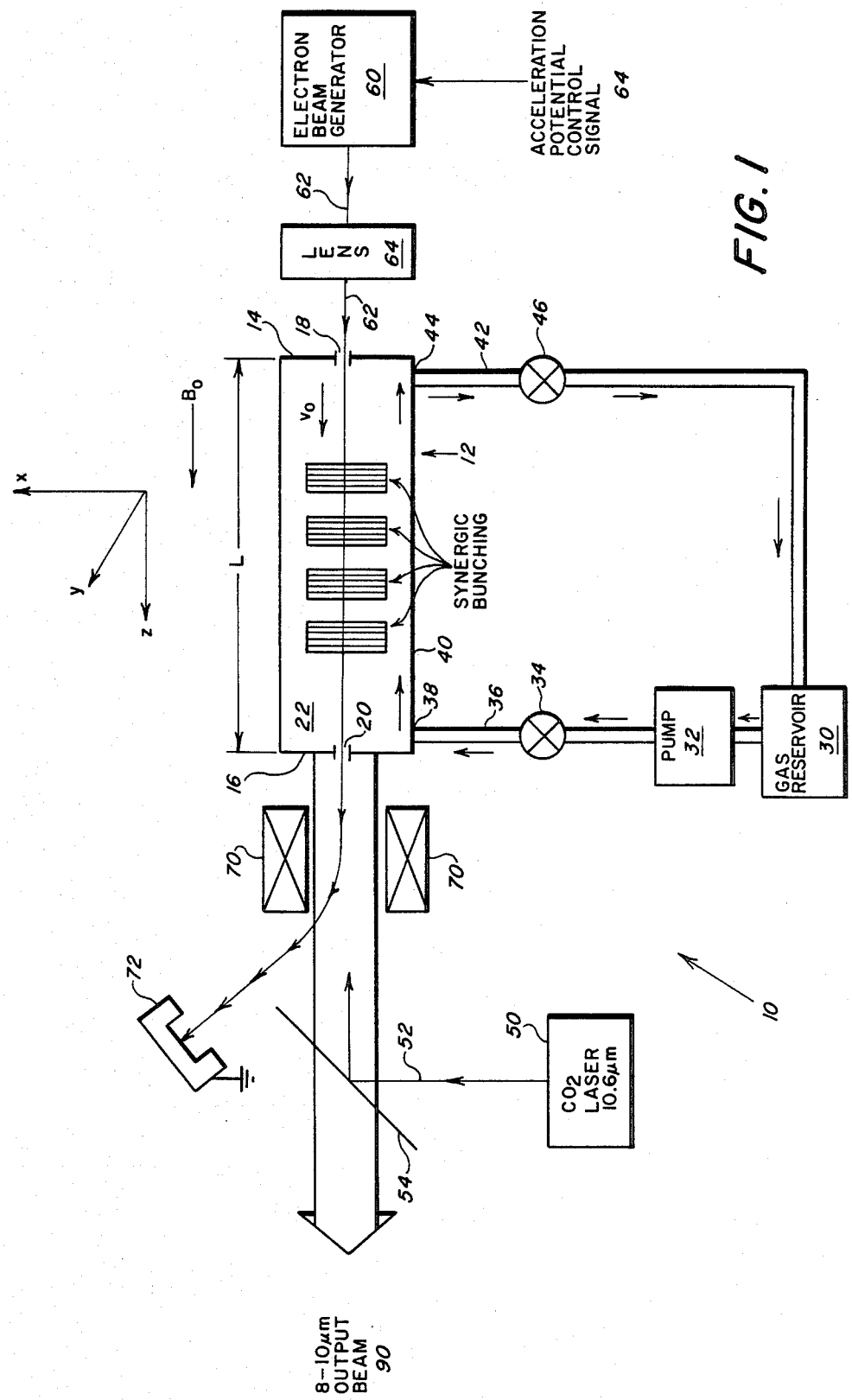
FIG. 1 is a schematic illustration of a synergistic quasi-free electron laser according to a preferred embodiment of the present Invention.

Referring now to the drawings, wherein like reference numerals designate identical or corresponding parts throughout the several views, and more particularly to FIG. 1 thereof, a synergistic quasi-free electron laser 10 is schematically illustrated according to a preferred embodiment of the present Invention. The laser 10 includes an elongated interaction chamber 12 having its respective ends enclosed by first and second windows 14 and 16, respectively. The interaction chamber 12 has a length L of preferably at least $10^4$ wavelengths or about 10 cm or greater. The remaining dimensions of the interaction chamber are non-critical.

The windows 14 and 16 include respective axial openings 18 and 20 therein suitable for the passage of an electron beam as will be described in detail below. The first window 14 and the interaction chamber 12 may be formed from wellknown opaque materials such as aluminum. The second window 16 must be formed of a suitable optical material capable of transmitting radiation at 10.6 μm and in the 8 to 10 μm range. Such optical materials are well known in the art.

The interaction chamber 12 is filled with an ionizable plasma producing gas 22, such as any inert gas or any hydrocarbon containing gas such as methane, at slightly reduced atmospheric pressure. It should be understood that standard atmospheric pressure may be used under some circumstances as should be apparant to those of skill in the art. The gas 22 is supplied from a gas reservoir 30 through a pump 32, a valve 34, and an inlet conduit 35 passing through an inlet port 38 in the side wall 40 of the interaction chamber near the second window 16. The gas 22 is removed from the interaction chamber 12 through an exit conduit 42 coupling an exit port 44 in the interaction chamber sidewall 40 and the gas reservoir 30. A second valve 46 controls the flow of the gas 22 in the exit conduit 42. The exit port 44 is located near the first window 14. Due to the locations of the inlet port 38 and the exit port 44 the gas 22 travels through the interaction chamber 12 in the -Z direction as controlled by the valves 34 and 46.

A compact $CO_2$ gas laser 50 generates a 10.6 μm infrared laser pump beam 52 having a power level on the order of 1000 watts. The pump beam 52 is directed by a mirror 54 to pass through the window 16 into the interaction chamber 12 traveling in the $-Z$ direction. The mirror 54 is semi-transparent to radiation in the 8 to 10 μm range. Such mirrors are well-known in the art.

The laser pump beam 52 passing through the interaction chamber 12 acts to ionize the plasma gas 22 contained therein in a manner well-known in the art. Alternative methods of ionizing the gas, such as by passing electric arcs through the gas and other well-known plasma producing gun methods, may also be used. As will be described further below, the presence of the laser pump beam in the interaction chamber is necessary for the operation of the present Invention. The ionization of the plasma gas by the pump beam is thus preferably used because it results in a multiple use of the laser pump beam with a consequent reduction in required hardware.

An electron beam generator 60, such as a Pierce gun, generates a non-relativistic electron beam 62 having an energy level on the order of 5 keV. The energy level of the electron beam 62 may be varied under control of an acceleration potential control signal 64 in a manner well-known in the art. The electron beam 62 is focused by an electron lens 64 to remove off-axis components and is directed by the lens 64 through the opening 18 in the window 14 to travel through the interaction chamber 12 in the Z direction. The electron beam 62 exits the interaction chamber 12 through the opening 20 in the window 16. A bending magnet 70 deflects the electron beam 62 around the mirror 54. The deflected electron beam is collected by a collector anode 72 in a well-known manner. Although not illustrated in FIG. 1, it should be understood in principle that the energy of the electron beam may be conserved by recycling the exiting electron beam back to the generator 60 as is commonly done in the art. Due to the non-relativistic nature of the electron beam, beam recycling is not necessary in practice.

In operation, the valve 34 is opened to allow the interaction chamber 12 to be filled with the plasma gas 22. The laser beam 52 is directed into the interaction chamber 12 wherein the plasma gas 22 becomes ionized due to interaction with the laser beam to produce a puff of plasma having a density $n_p$ on the order of $10^{16}$ cm$^{-3}$. Simultaneously, the electron beam 62 is fired into the interaction chamber 12 where the electron beam, the laser beam, and the plasma interact to cause synergistic bunching of both the electron beam and the ionized plasma. The result of this bunching is to effectively produce a diffraction grating in the form of an effectively moving "plasma mirror" which moves with the electron beam in the Z direction. The diffraction grating can also be viewed as being stationary in the reference frame of the electron beam.

The moving electron beam plasma mirror collides head on with the oppositely propagating laser pump beam 52 and consequently backscatters a portion of the pump beam which exits the interaction chamber 12 through the window 16 and the mirror 54 to form an output beam 90 directed in the Z direction. Due to the Doppler effect, the frequency of the output beam 90 is up-shifted from that of the pump beam as given by:

$$\Omega_1 = \Omega_o\left[\left(1 + \frac{V_{ob}}{c}\right) \bigg/ \left(1 - \frac{V_{ob}}{c}\right)\right] \quad (1)$$

where:

$\Omega_1$ is the frequency of the backscattered output beam;

$\Omega_o$ the frequency of the laser pump beam;

$V_{ob}$ is the velocity of the electron beam; and c is the free-space velocity of light.

As should be apparent from Equation (1), the extent of the up-shift in frequency is a function of the electron velocity and thus is a function of the energy of the electron beam. For example, a 5.11 keV electron beam results in an output beam wavelength of 8 μm. The frequency of the output beam can thus be controlled by adjusting the acceleration potential of the electron beam generator 60 via the control signal 64.

The frequency of the backscattered output beam 90 can be further increased by applying a uniform magnetic field $B_o$ in the Z axis direction as shown in FIG. 1. Under the influence of the magnetic field, the frequency of the backscattered beam may be further increased toward the cyclotron frequency $\Omega_c$ as defined by:

$$\Omega_c = |e|B_o/m_o c \quad (2)$$

where: e is the electron charge;

$m_o$ is the electron rest mass; and c is the free-space velocity of light.

It should be understood that the application of the magnetic field for higher frequency coupling is merely an option provided by the present Invention and is not necessary to provide satisfactory results.

It should be understood that the laser 10 is an intermittent device which produces a pulsed output. As such, the laser 10 must be recycled at the end of each pulsed output 90. Recycling is accomplished by removing the pump laser beam 52 and the electron beam 62. The valves 34 and 46 are opened to allowed the ionized plasma gas 22 within the interaction chamber to be flushed out and replaced by neutral plasma gas from the gas reservoir 30. The ionized gas is returned via exit conduit 42 to the gas reservoir where it returns to the de-ionized state.

As previously described, the flow of plasma gas within the interaction chamber is in the $-Z$ direction and thus is counter to the direction of propagation of the electron beam 62. Although unnecessary, the counter-flow of gas is desirable because it allows the interaction chamber to be flushed out more rapidly and thus improves the recycling time of the laser.

Although only one pair of inlet and exit ports for the flow of plasma gas are illustrated in FIG. 1, it should be understood that many such ports could be spaced about the periphery of the interaction chamber 12 in a circumferential direction in order to enhance the uniformity of the gas flow within the interaction chamber. As an alternative, the inlet and exist ports could take the form of circumferentially disposed annular slots at each end of the interaction chamber 12. These annular slots could also be located in the plane of the windows 14 and 16, respectively, as should be apparent to the skilled practitioner.

The physical mechanism of the present Invention is based on the coherent bunching of the beam plasma system due to the nonlinear ponderomotive force and a slow beam wave having a negative energy; i.e., the two-stream instability combined synergistically with the non-linear stimulated Raman backscattering. The synergic backscattering growth rate $\Gamma_{syn}$ is the sum of the two instabilities as given by:

$$\Gamma_{syn} = \omega_{op}\left[\left(\frac{\sqrt{3}}{2}\right)\left(\frac{n_b}{2n_p}\right)^{\frac{1}{3}} + (V_{os}/4c)(\Omega_o/\omega_{op})^{\frac{1}{2}}\right] \quad (3)$$

where:

$n_b$ is the electron beam density;

$n_p$ is the plasma density;

$V_{os}$ is the electron beam quiver velocity;

c is the free space velocity of light;

$\Omega_o$ is the laser pump beam frequency; and $\omega_{op}$ is the plasma frequency.

In the right side of Equation (3), the first term is the two-stream growth rate and the second term is the stimulated Raman growth rate.

When the negative energy beam wave meets the positive energy plasma wave, the consequence is a two stream instability. Negative energy means that the difference of the kinetic energy of the electron beam ($\frac{1}{2} N_o m_o V_o^2$) with and without the presence of the slow longitudinal wave ($\omega < k \cdot V_o$) is negative as given by:

$$\frac{1}{2}N_o m_o (V_o - V^L)^2 - \frac{1}{2}N_o m_o V_o^2 = -N_o m_o V_o \cdot V^L + \frac{1}{2}N_o m_o V^L \cdot V^L \quad (4)$$

or, equivalently, the wave energy spectral density W as given by:

$$W = \frac{\partial}{\partial \omega}[\omega \epsilon_o(1+\epsilon)]\frac{\langle E^2 \rangle}{2} < 0 \quad (5)$$

becomes negative for the slow wave $\omega/k < V_o$. In the case of a pump induced $V^L$, the first term of the right side of Equation (4) can be negative for the beam wave while the second term is the pump radiation pressure. Both can coherently bunch the beam and plasma system in an oscillation and therefore synergistically scatter back the laser pump beam.

The various symbols present in Equations (4) and (5) are defined as follows:

$N_o$ is the electron beam density;

$m_o$ is the electron mass;

$V_o$ is the electron beam velocity;

$\omega$ is the angular frequency of the electron plasma;

k is the electron plasma oscillation wave number;

$V^L$ is the linear response velocity of the electron beam due to the laser pump beam;

$\epsilon_o$ is the vacuum dielectric constant;

$\epsilon$ is the dielectric constant of the beam plasma; and

E is the electric field of the laser pump beam.

The conventional laser energy is derived from the potential energy of bunched electrons and the laser power from the decay of the inverse population. Similarly, the energy of the free electron laser (FEL) is obtained from the kinetic energy of free electrons and the power from the positive slope of the electron energy distribution function; e.g., the left-hand side of the Maxwellian distribution. Since the stochastic longitudinal beam or plasma oscillation has been called the quasi-particle plasmon, then the plasmon contributing free electron laser may be termed the quasi-free electron laser both in the sense of quasi-particles and in the sense of the limited regime of their frequency as described below.

FIG. 2 is a dispersion diagram for the synergistic backscattering of the present Invention. In FIG. 2, $\vec{k_o}$, $\vec{k_1}$, and $\vec{k_2}$ respectively designate the laser pump wave vector, the backscattered output wave vector, and the beam plasma wave vector. The dispersion diagram of FIG. 2 illustrates that both energy and momentum are conserved in the system of the present Invention. Thus by a simple vector analysis:

$$\vec{k_1} = \vec{k_o} - \vec{k_2} \text{ conservation of momentum)} \quad (6)$$

and $$\omega_1 = \Omega_o + \omega_{op} \text{ (conservation of energy)} \quad (7)$$

where $\omega_1$ is the frequency of the backscattered output wave.

If one solves the Maxwell-fluid equations consistantly, then the dispersion relation of the synergistic instability can be derived. The qualitative behavior is given as:

$$\delta E_1(t)\frac{\Gamma_{syn}}{\omega_{op}} \approx \delta E_2^*(t)\frac{V_{os}}{c} \quad (8)$$

where:

$\delta E_1(t)$ is the backscattering complex amplitude; and $\delta E_2^*(t)$ is the complex conjugate of the beam-plasma wave amplitude.

It follows from Equation (8) that the backscattering complex amplitude $\delta E_1(t)$ and the beam plasma wave amplitude $\delta E_1(t)$ are intimately related. Thus, the reduced synergistic growth rate $\Gamma_{syn}/\omega_{op}$, is about 1 percent. Therefore, the growth of backscattering matches simultaneously with the growth of the beam-plasma wave and, therefore, the plasma will not become nonlinear first to destroy the desired process.

The quasi-free electron laser of the present Invention differs from the free electron laser mainly in the energy extraction mechanism. Since the energy of a 1 $\mu$m wavelength is 1 eV, the energy increment from 10.6 to 8 $\mu$m is from 0.1 to 0.125 eV. This is a trivial 25 percent compared to that of the free electron laser energy $$4\gamma_o^2 = 4\left(1 - \frac{V_{ob}}{c}\right)^{-1}.$$

If a 1000 watt $CO_2$ laser pump beam were upshifted equivalently by a quasi-free electron laser according to the present Invention which is made of a two stream bunched beam-plasma system having a thickness of less than 1 cm/pulse and assuming a 1 percent reflection efficiency, then a tunable output of 12.5 watts in the atmospheric propagation window would be produced. The size of a quasi-free electron laser of this power level is estimated to be on the order of 1 $M^3$.

A thorough mathematical analysis of the synergistic laser of the present Invention is given in H. H. Szu, "Laser Light Backscattering Off an Electron Beam - Plasma System", IEEE Journal of Quantum Electronics, Vol. QE-19, No. 3, pages 379–388, March 1983. The contents of this article are incorporated herein by reference.

Obviously, numerous additional modifications and variations of the present Invention are possible in light of the above teachings. It is therefore to be understood that within the scope of the appended claims, the Invention may be practiced otherwise than as specifically described herein.

What is claimed as new and desired to be secured by Letters Patent of the United States is:

1. An infrared radiation generator device comprising:
    means for producing a volume of ionized gas plasma;
    means for directing an electron beam through said gas plasma in a first direction; and
    means for directing a laser pump beam into said gas plasma in a second direction opposite said first direction to produce synergistic bunching of said electron beam and said gas plasma;
    said synergistically bunched electron beam and gas plasma acting to backscatter a portion of said laser pump beam to form an output beam;
    said output beam having a frequency $\Omega_1$ as given by:

$$\Omega_1 = \Omega_o\left[\left(1 + \frac{V_{ob}}{c}\right) / \left(1 - \frac{V_{ob}}{c}\right)\right]$$

where:
    $\Omega_o$ is the frequency of said laser pump beam;
    $V_{ob}$ is the velocity of said electron beam; and
    c is the free space velocity of light.

2. The infrared radiation generator device as recited in claim 1, which further comprises:
    means for varying the velocity of said electron beam, the frequency of said output beam varying in response to variations in the velocity of said electron beam.

3. The infrared radiation generator device as recited in claim 1, wherein the synergistic backscattering growth rate $\Gamma_{syn}$ of said output beam is given by:

$$\Gamma_{syn} = \omega_{op}\left[\left(\frac{\sqrt{3}}{2}\right)\left(\frac{n_b}{2n_p}\right)^{\frac{1}{3}} + (V_{os}/4c)(\Omega_o/\omega_{op})^{\frac{1}{2}}\right]$$

where:
    $n_b$ is the density of said electron beam;
    $n_p$ is the density of said gas plasma;
    $V_{os}$ is the quiver velocity of said electron beam;
    c is the free space velocity of light;
    $\Omega_o$ is the frequency of said laser pump beam; and
    $\omega_{op}$ is the frequency of said gas plasma.

4. The infrared radiation generator device as recited in claim 1, wherein said means for producing said volume of ionized gas plasma comprises:
    an interaction chamber;
    means for filling said interaction chamber with an ionizable gas; and
    means for ionizing said ionizable gas in said interaction chamber to produce said ionized gas plasma.

5. The infrared radiation generator device as recited in claim 4, wherein said ionizable gas comprises an inert gas.

6. The infrared radiation generator device as recited in claim 4, wherein said ionizable gas comprises a hydrocarbon containing gas.

7. The infrared radiation generator device as recited in claim 4, wherein said interaction chamber comprises:
    means integral with said interaction chamber for allowing the passage of said electron beam through said interaction chamber; and
    window means integral with said interaction chamber for transmitting said laser pump beam into said interaction chamber and for transmitting said output beam out of said interaction chamber.

8. The infrared radiation generator device as recited in claim 7, wherein said means for directing said laser pump beam comprises:
    laser means for generating said laser pump beam; and
    means for transmitting said laser pump beam into said ionized gas plasma.

9. The infrared radiation generator device as recited in claim 8, wherein said laser means comprises a $CO_2$ infrared laser.

10. The infrared radiation generator device as recited in claim 8, wherein said means for transmitting comprises:
    mirror means coupled to receive the pump laser beam output of said laser means for redirecting said pump laser beam to pass through said window means into said interaction chamber, said mirror means being at least partially transparent to the passage of radiation at the frequency of said output beam, said output beam passing through said mirror means after being transmitted by said window means out of said interaction chamber.

11. The infrared radiation generator device as recited in claim 1, wherein said means for directing said electron beam comprises:
   electron beam generator means for generating said electron beam; and
   electron lens means coupled to receive said electron beam from said electron beam generator means for focusing said electron beam into said gas plasma.

12. The infrared radiation generator device as recited in claim 1, wherein said means for directing said laser pump beam comprises:
   laser means for generating said laser pump beam; and
   means for transmitting said laser pump beam into said ionized gas plasma.

13. The infrared radiation generator device as recited in claim 12, wherein said laser means comprises a $CO_2$ infrared laser.

14. An infrared radiation generator device comprising:
   means for producing a volume of ionized gas plasma;
   means for directing an electron beam through said gas plasma in a first direction; and
   means for directing a laser pump beam into said gas plasma in a second direction opposite said first direction to produce synergistic bunching of said electron beam and said gas plasma;
   said synergistically bunched electron beam and gas plasma acting to backscatter a portion of said laser pump beam to form an output beam having a growth rate $\Gamma_{syn}$ given by:

$$\Gamma_{syn} = \omega_{op}\left[\left(\frac{\sqrt{3}}{2}\right)\left(\frac{n_b}{2n_p}\right)^{\frac{1}{3}} + (V_{os}/4c)(\Omega_o/\omega_{op})^{\frac{1}{2}}\right]$$

where:
   $m_b$ is the density of said electron beam
   $m_p$ is the density of said gas plasma;
   $V_{os}$ is the quiver velocity of said electron beam;
   c is the free-space velocity of light;
   $\Omega_o$ is the frequency of said laser pump beam; and
   $\omega_{op}$ is the frequency of said gas plasma.

15. The infrared radiation generator device as recited in claim 14, which further comprises:
   means for varying the velocity of said electron beam and for varying the frequency of said output beam as given by:

$$\Omega_1 = \Omega_o\left[\left(1 + \frac{V_{ob}}{c}\right)/\left(1 - \frac{V_{ob}}{c}\right)\right]$$

where:
   $\Omega_1$ is the frequency of said output beam;
   $\Omega_o$ is the frequency of said laser pump beam;
   $V_{ob}$ is the velocity of said electron beam; and
   c is the free-space velocity of light.

16. A method of generating infrared radiation, which comprises the steps of:
   providing a volume of ionized gas plasma;
   directing an electron beam through said gas plasma in a first direction; and
   directing a laser pump beam into said gas plasma in a second direction opposite said first direction to produce synergistic bunching of said electron beam and said gas plasma;
   said synergistically bunched electron beam and gas plasma acting to backscatter a portion of said laser pump beam to form an output beam having a growth rate $\Gamma_{syn}$ given by:

$$\Gamma_{syn} = \omega_{op}\left[\left(\frac{\sqrt{3}}{2}\right)\left(\frac{n_b}{2n_p}\right)^{\frac{1}{3}} + (V_{os}/4c)(\Omega_o/\omega_{op})^{\frac{1}{2}}\right]$$

where:
   $m_b$ is the density of said electron beam;
   $m_p$ is the density of said gas plasma;
   $V_{os}$ is the quiver velocity of said electron beam;
   c is the free-space velocity of light;
   $\Omega_o$ is the frequency of said laser pump beam; and
   $\omega_{op}$ is the frequency of said gas plasma.

17. The method of generating infrared radiation as recited in claim 16, which further comprises the step of:
   adjusting the frequency of said output beam by adjusting the velocity of said electron beam as given by:

$$\Omega_1 = \Omega_o\left[\left(1 + \frac{V_{ob}}{c}\right)/\left(1 - \frac{V_{ob}}{c}\right)\right]$$

where:
   $\Omega_1$ is the frequency of said output beam;
   $\Omega_o$ is the frequency of said laser pump beam;
   $V_{ob}$ is the velocity of said electron beam; and
   c is the free-space velocity of light.

* * * * *